(12) United States Patent
Dally et al.

(10) Patent No.: US 8,732,711 B2
(45) Date of Patent: May 20, 2014

(54) TWO-LEVEL SCHEDULER FOR MULTI-THREADED PROCESSING

(75) Inventors: William James Dally, Stanford, CA (US); Stephen William Keckler, San Jose, CA (US); David Tarjan, Santa Clara, CA (US); John Erik Lindholm, Saratoga, CA (US); Mark Alan Gebhart, Austin, TX (US); Daniel Robert Johnson, Champaign, IL (US)

(73) Assignee: NVIDIA Corporation, Santa Clara, CA (US)

( * ) Notice: Subject to any disclaimer, the term of this patent is extended or adjusted under 35 U.S.C. 154(b) by 428 days.

(21) Appl. No.: 13/151,094

(22) Filed: Jun. 1, 2011

(65) Prior Publication Data

US 2012/0079503 A1    Mar. 29, 2012

Related U.S. Application Data

(60) Provisional application No. 61/386,248, filed on Sep. 24, 2010.

(51) Int. Cl.
*G06F 9/46* (2006.01)
(52) U.S. Cl.
USPC ............................ 718/102; 718/105; 718/108
(58) Field of Classification Search
None
See application file for complete search history.

(56) References Cited

U.S. PATENT DOCUMENTS

| | | | | |
|---|---|---|---|---|
| 6,606,704 | B1* | 8/2003 | Adiletta et al. | 712/248 |
| 6,625,654 | B1* | 9/2003 | Wolrich et al. | 709/230 |
| 6,668,317 | B1* | 12/2003 | Bernstein et al. | 712/245 |
| 7,111,296 | B2* | 9/2006 | Wolrich et al. | 718/102 |
| 8,468,539 | B2* | 6/2013 | Eichenberger et al. | 718/106 |
| 8,504,992 | B2* | 8/2013 | Weber et al. | 717/127 |
| 2010/0211935 | A1* | 8/2010 | Weber et al. | 717/127 |
| 2011/0055484 | A1* | 3/2011 | Eichenberger et al. | 711/125 |

* cited by examiner

*Primary Examiner* — Van Nguyen
(74) *Attorney, Agent, or Firm* — Zilka-Kotab, PC

(57) ABSTRACT

One embodiment of the present invention sets forth a technique for scheduling thread execution in a multi-threaded processing environment. A two-level scheduler maintains a small set of active threads called strands to hide function unit pipeline latency and local memory access latency. The strands are a sub-set of a larger set of pending threads that is also maintained by the two-leveler scheduler. Pending threads are promoted to strands and strands are demoted to pending threads based on latency characteristics. The two-level scheduler selects strands for execution based on strand state. The longer latency of the pending threads is hidden by selecting strands for execution. When the latency for a pending thread is expired, the pending thread may be promoted to a strand and begin (or resume) execution. When a strand encounters a latency event, the strand may be demoted to a pending thread while the latency is incurred.

19 Claims, 10 Drawing Sheets

TWO-LEVEL SCHEDULER FOR MULTI-THREADED PROCESSING

CROSS-REFERENCE TO RELATED APPLICATIONS

This application claims priority benefit to United States provisional patent application titled, "Strands: Exploiting Sub-Threads Free From Long-Latency Operations," filed on Sep. 24, 2010 and having Ser. No. 61/386,248. This related application is also hereby incorporated by reference in its entirety.

BACKGROUND OF THE INVENTION

1. Field of the Invention

The present invention generally relates to multi-threaded program execution and more specifically to a two-level scheduler for multi-threaded processing.

2. Description of the Related Art

Conventional graphics processing units (CPUs) use a large number of hardware execution threads to hide both function unit pipeline latency and memory access latency. Extreme multi-threading requires a complicated thread scheduler.

Accordingly, what is needed in the art is an improved system and method for scheduling thread execution in a multi-threaded processing environment.

SUMMARY OF THE INVENTION

One embodiment of the present invention sets forth a technique for scheduling thread execution in a multi-threaded processing environment. This invention sets forth a multi-threaded processor architecture intended to reduce the area and power of a thread execution unit and increase thread processing efficiency. A two-level scheduler maintains a small set of active threads called strands to hide function unit pipeline latency and local memory access latency. The strands are a sub-set of a larger set of pending threads that is also maintained by the two-leveler scheduler. The non-strand threads of the pending threads have encountered a latency event, such as a non-local memory access, so the threads are separated into two sets to hide the longer main memory access latency. Pending threads are promoted to strands and strands are demoted to pending threads based on latency characteristics. The two-level scheduler selects strands for execution based on strand state.

Various embodiments of a method of the invention for executing a program in a multi-threaded processing environment includes receiving a plurality of threads for execution that each include a portion of the program and storing state specific to each thread of the plurality of threads in thread entries. A sub-set of threads is promoted from the plurality of threads to occupy strand slots based on a latency characteristic. A first strand from the strand slots is selected for execution and the first strand is issued for execution.

The two-level scheduler provides a reduction in power consumption by limiting the allocation of temporary register cache resources only to the strands. A register file is a backing memory allocated for the storage of pending thread resources.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
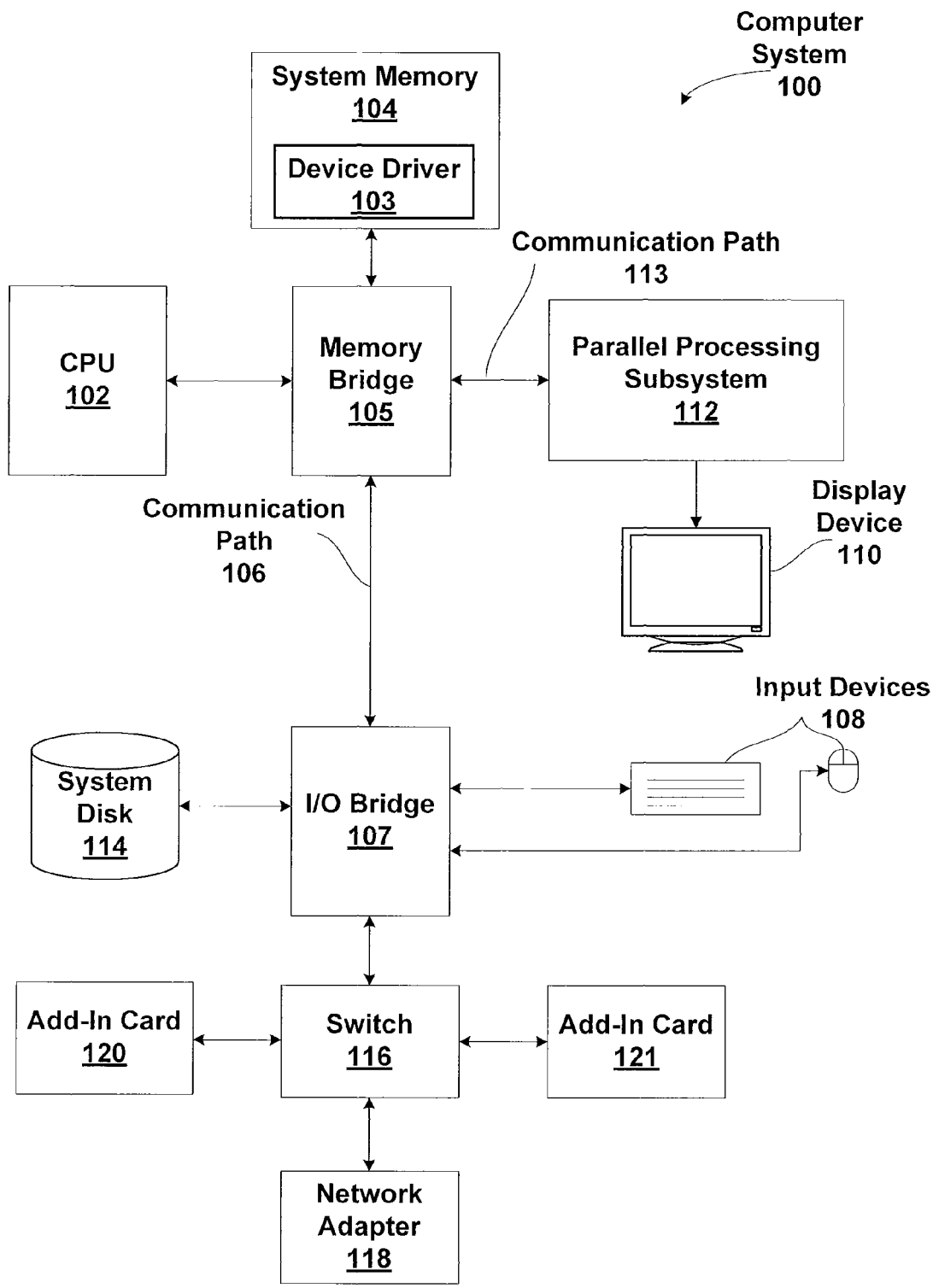
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
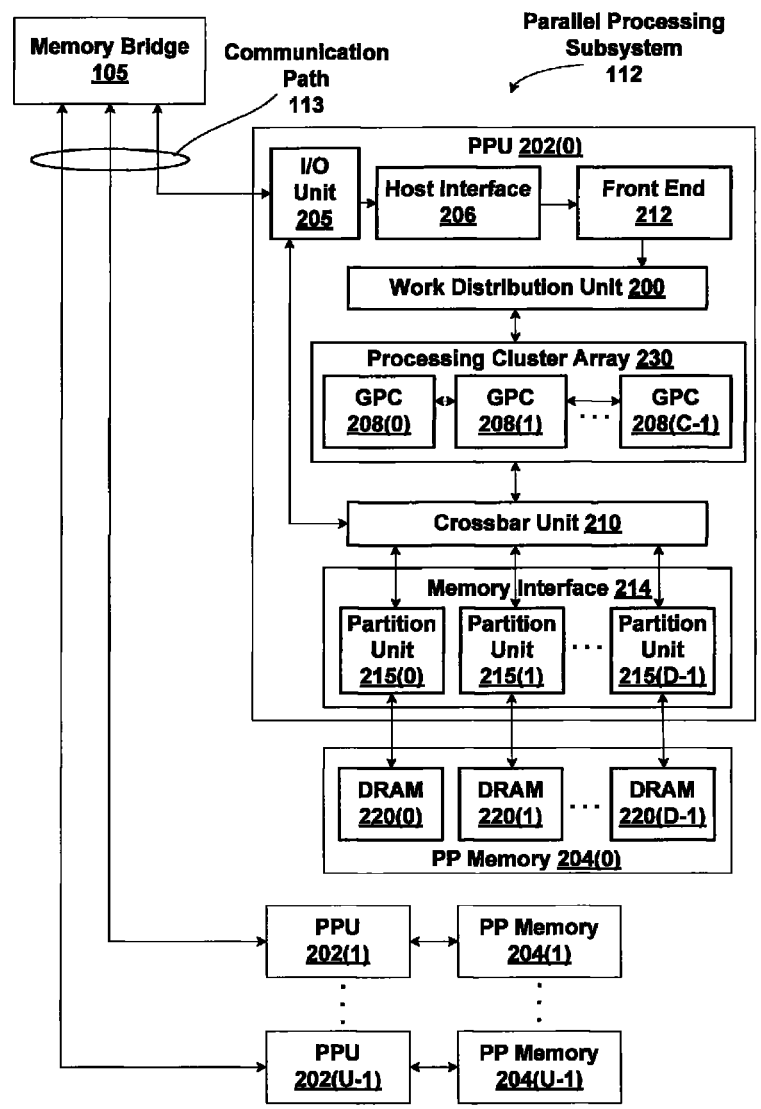
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

When PPU 202 is used for graphics processing, for example, the processing workload for each patch is divided into approximately equal sized tasks to enable distribution of the tessellation processing to multiple GPCs 208. A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data, produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where D≥1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
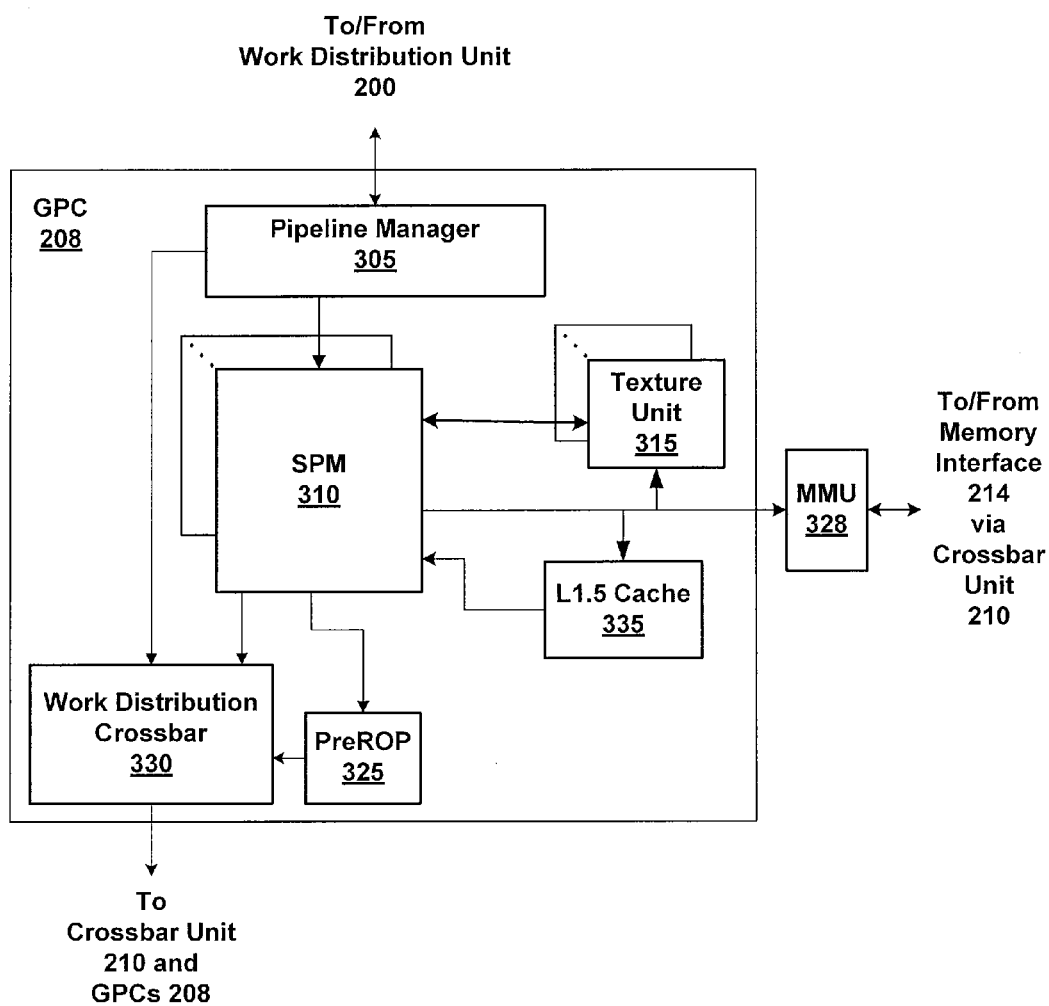
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M J, each SPM 310 configured to process one or more thread groups. Also, each SPM 310 advantageously includes an identical set of functional execution units (e.g., arithmetic logic units, and load-store units—shown as Exec units 302 and LSUs 303 in FIG. 3C) that may be pipelined, allowing a new instruction to be issued before a previous instruction has finished. Any combination of functional execution units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to G*M thread groups can be executing in GPC 208 at any given time.

Additionally, a plurality of related thread groups may be active (in different phases of execution) at the same time within an SPM 310. This collection of thread groups is referred to herein as a "cooperative thread array" ("CTA") or "thread array." The size of a particular CTA is equal to m*k, where k is the number of concurrently executing threads in a thread group and is typically an integer multiple of the number of parallel processing engines within the SPM 310, and m is the number of thread groups simultaneously active within the SPM 310. The size of a CTA is generally determined by the programmer and the amount of hardware resources, such as memory or registers, available to the CTA.

Each SPM 310 contains an L1 cache (not shown) or uses space in a corresponding L1 cache outside of the SPM 310 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory. Additionally, an L1.5 cache 335 may be included within the GPC 208, configured to receive and hold data fetched from memory via memory interface 214 requested by SPM 310, including instructions, uniform data, and constant data, and provide the requested data to SPM 310. Embodiments having multiple SPMs 310 in GPC 208 beneficially share common instructions and data cached in L1.5 cache 335.

Each GPC 208 may include a memory management unit (MMU) 328 that is configured to map virtual addresses into physical addresses. In other embodiments, MMU(s) 328 may reside within the memory interface 214. The MMU 328 includes a set of page table entries (PTEs) used to map a virtual address to a physical address of a tile and optionally a cache line index. The MMU 328 may include address translation lookaside buffers (TLB) or caches which may reside within multiprocessor SPM 310 or the L1 cache or GPC 208. The physical address is processed to distribute surface data access locality to allow efficient request interleaving among partition units. The cache line index may be used to determine whether of not a request for a cache line is a hit or miss.

In graphics and computing applications, a GPC 208 may be configured such that each SPM 310 is coupled to a texture unit 315 for performing texture mapping operations, e.g., determining texture sample positions, reading texture data, and filtering the texture data. Texture data is read from an internal texture L1 cache (not shown) or in some embodiments from the L1 cache within SPM 310 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A preROP (pre-raster operations) 325 is configured to receive data from SPM 310, direct data to ROP units within partition units 215, and perform optimizations for color blending, organize pixel color data, and perform address translations.

It will be appreciated that the core architecture described herein is illustrative and that variations and modifications are possible. Any number of processing units, e.g., SPMs 310 or texture units 315, preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing units, L1 caches, and so on.

Figure 3B:
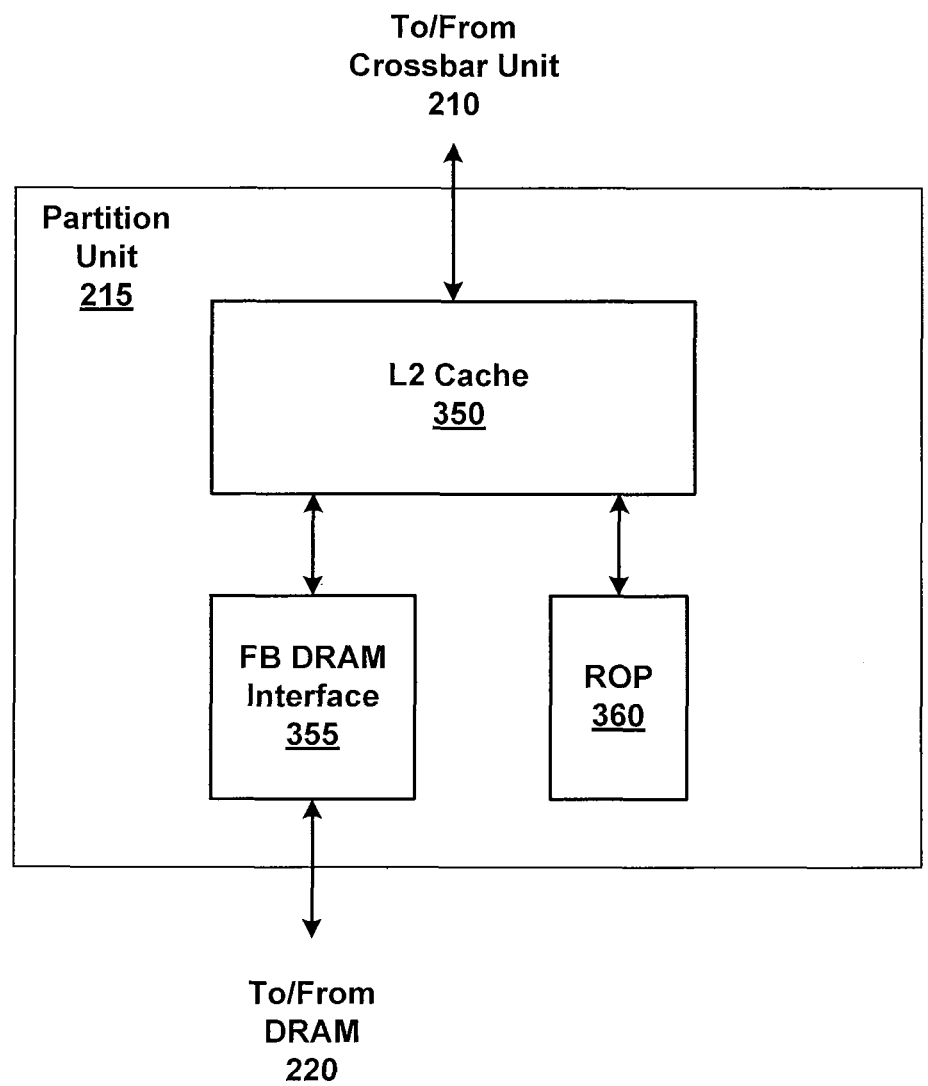
FIG. 3B is a block diagram of a partition unit within one of the PPUs of FIG. 2, according to one embodiment of the present invention.

FIG. 3B is a block diagram of a partition unit 215 within one of the PPUs 202 of FIG. 2, according to one embodiment of the present invention. As shown, partition unit 215 includes a L2 cache 350, a frame buffer (FB) DRAM interface 355, and a raster operations unit (ROP) 360. L2 cache 350 is a read/write cache that is configured to perform load and store operations received from crossbar unit 210 and ROP 360. Read misses and urgent writeback requests are output by L2 cache 350 to FB DRAM interface 355 for processing. Dirty updates are also sent to FB 355 for opportunistic processing. FB 355 interfaces directly with DRAM 220, outputting read and write requests and receiving data read from DRAM 220.

In graphics applications, ROP 360 is a processing unit that performs raster operations, such as stencil, z test, blending, and the like, and outputs pixel data as processed graphics data for storage in graphics memory. In some embodiments of the present invention, ROP 360 is included within each GPC 208 instead of partition unit 215, and pixel read and write requests are transmitted over crossbar unit 210 instead of pixel fragment data.

The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 may be configured to compress z or color data that is written to memory and decompress z or color data that is read from memory.

Persons skilled in the art will understand that the architecture described in FIGS. 1, 2, 3A, and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

In embodiments of the present invention, it is desirable to use PPU 122 or other processor(s) of a computing system to execute general-purpose computations using thread arrays. Each thread in the thread array is assigned a unique thread identifier ("thread ID") that is accessible to the thread during its execution. The thread ID, which can be defined as a one-dimensional or multi-dimensional numerical value controls various aspects of the thread's processing behavior. For instance, a thread ID may be used to determine which portion of the input data set a thread is to process and/or to determine which portion of an output data set a thread is to produce or write.

A sequence of per-thread instructions may include at least one instruction that defines a cooperative behavior between the representative thread and one or more other threads of the thread array. For example, the sequence of per-thread instructions might include an instruction to suspend execution of operations for the representative thread at a particular point in the sequence until such time as one or more of the other threads reach that particular point, an instruction for the representative thread to store data in a shared memory to which one or more of the other threads have access, an instruction for the representative thread to atomically read and update data stored in a shared memory to which one or more of the other threads have access based on their thread IDs, or the like. The CTA program can also include an instruction to compute an address in the shared memory from which data is to be read, with the address being a function of thread ID. By defining suitable functions and providing synchronization techniques, data can be written to a given location in shared memory by one thread of a CTA and read from that location by a different thread of the same CTA in a predictable manner. Consequently, any desired pattern of data sharing among threads can be supported, and any thread in a CTA can share data with any other thread in the same CTA. The extent, if any, of data sharing among threads of a CTA is determined by the CTA program; thus, it is to be understood that in a particular application that uses CTAs, the threads of a CTA might or might not actually share data with each other, depending on the CTA program, and the terms "CTA" and "thread array" are used synonymously herein.

Figure 3C:
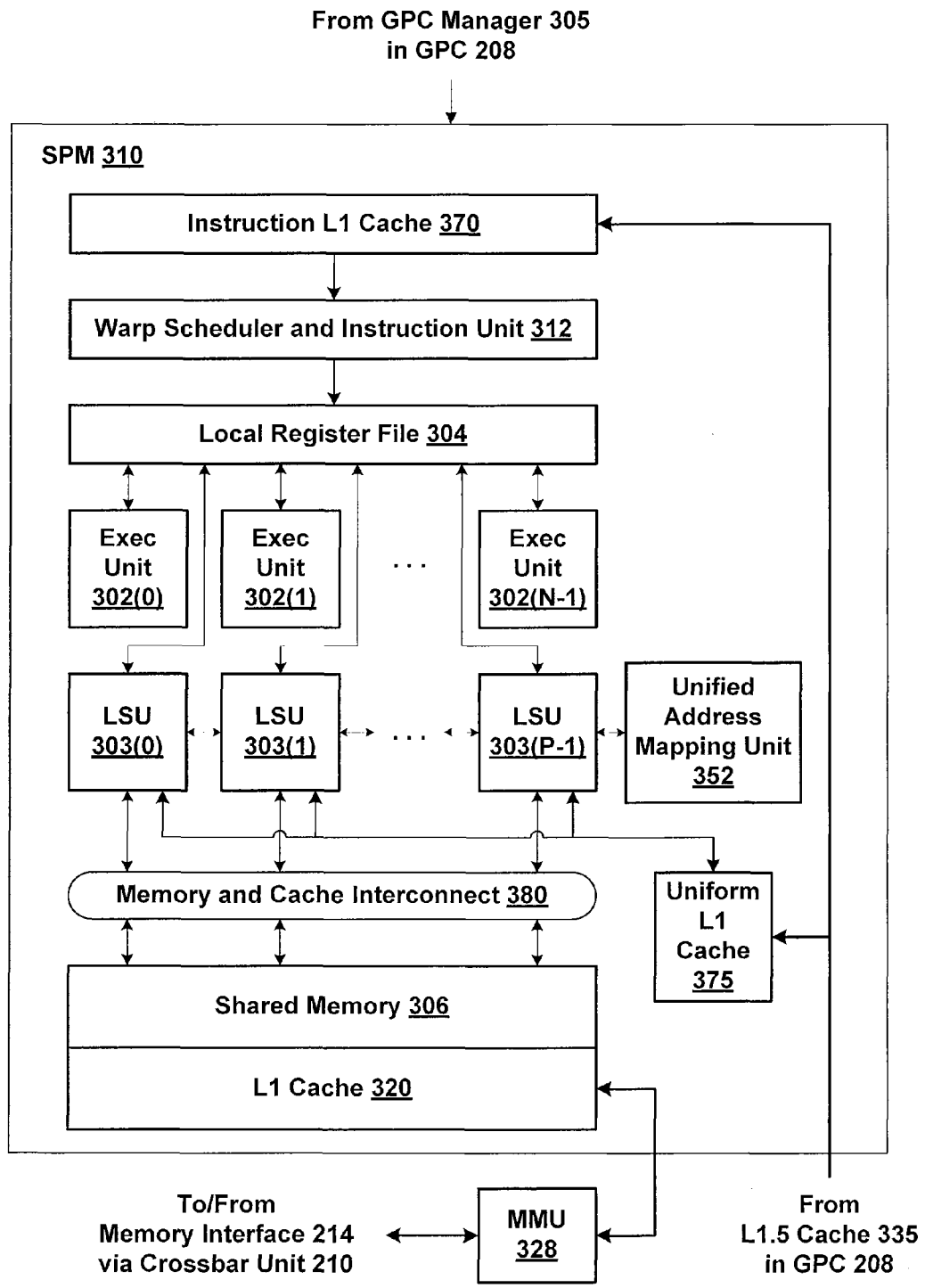
FIG. 3C is a block diagram of a portion of the SPM of FIG. 3A, according to one embodiment of the present invention.

FIG. 3C is a block diagram of the SPM 310 of FIG. 3A, according to one embodiment of the present invention. The SPM 310 includes an instruction L1 cache 370 that is configured to receive instructions and constants from memory via L1.5 cache 335. A warp scheduler and instruction unit 312 receives instructions and constants from the instruction L1 cache 370 and controls local register file 304 and SPM 310 functional units according to the instructions and constants. The SPM 310 functional units include N exec (execution or processing) units 302 and P load-store units (LSU) 303.

SPM 310 provides on-chip (internal) data storage with different levels of accessibility. Special registers (not shown) are readable but not writeable by LSU 303 and are used to store parameters defining each CTA thread's "position." In one embodiment, special registers include one register per CTA thread (or per exec unit 302 within SPM 310) that stores a thread ID; each thread ID register is accessible only by a respective one of the exec unit 302. Special registers may also include additional registers, readable by all CTA threads (or by all LSUs 303) that store a CTA identifier, the CTA dimensions, the dimensions of a grid to which the CTA belongs, and an identifier of a grid to which the CTA belongs. Special registers are written during initialization in response to commands received via front end 212 from device driver 103 and do not change during CTA execution.

A parameter memory (not shown) stores runtime parameters (constants) that can be read but not written by any CTA thread (or any LSU 303). In one embodiment, device driver 103 provides parameters to the parameter memory before directing SPM 310 to begin execution of a CTA that uses these parameters. Any CTA thread within any CTA (or any exec unit 302 within SPM 310) can access global memory through a memory interface 214. Portions of global memory may be stored in the L1 cache 320.

Local register file 304 is used by each CTA thread as scratch space; each register is allocated for the exclusive use of one thread, and data in any of local register file 304 is accessible only to the CTA thread to which it is allocated. Local register file 304 can be implemented as a register file that is physically or logically divided into P lanes, each having some number of entries (where each entry might store, e.g., a 32-bit word). One lane is assigned to each of the N exec units 302 and P load-store units LSU 303, and corresponding entries in different lanes can be populated with data for different threads executing the same program to facilitate SIMD execution. Different portions of the lanes can be allocated to different ones of the G concurrent thread groups, so that a given entry in the local register file 304 is accessible only to a particular thread. In one embodiment, certain entries within the local register file 304 are reserved for storing thread identifiers, implementing one of the special registers.

Shared memory 306 is accessible to all CTA threads (within a single CTA); any location in shared memory 306 is accessible to any CTA thread within the same CTA (or to any processing engine within SPM 310). Shared memory 306 can be implemented as a shared register file or shared on-chip cache memory with an interconnect that allows any processing engine to read from or write to any location in the shared memory. In other embodiments, shared state space might map onto a per-CTA region of off-chip memory, and be cached in L1 cache 320. The parameter memory can be implemented as a designated section within the same shared register file or shared cache memory that implements shared memory 306, or as a separate shared register file or on-chip cache memory to which the LSUs 303 have read-only access. In one embodiment, the area that implements the parameter memory is also used to store the CTA ID and grid ID, as well as CTA and grid dimensions, implementing portions of the special registers. Each LSU 303 in SPM 310 is coupled to a unified address mapping unit 352 that converts an address provided for load and store instructions that are specified in a unified memory space into an address in each distinct memory space. Consequently, an instruction may be used to access any of the local, shared, or global memory spaces by specifying an address in the unified memory space.

A Two-Level Scheduler

A conventional thread scheduler arbitrates between all threads that are eligible for execution to select a thread for execution. As the number of threads increases in multi-threaded systems, the size of the register file needed to store the context for each thread increases. To hide long memory access latencies, processors such as CPUs and GPUs allocate a large number of hardware thread contexts for each multi-threaded processing unit so that the scheduler is better able to supply the multi-threaded execution units with instructions and operands on each clock cycle without incurring delays due to long memory access latencies. This large set of concurrently executing threads in turn increases scheduling complexity, thus increasing area and power requirements. Significant state must be maintained by the scheduler for each group of threads, including buffered instructions for each group of threads. In addition, performing scheduling among such a large set of candidate threads necessitates complex selection logic and policies.

In systems having threads configured to perform a combination of low latency operations and local memory accesses and higher latency memory accesses, partitioning the threads into two different classes simplifies the selection process. A two-level scheduler partitions threads into two classes: (1) strands or active threads that are issuing instructions or waiting on relatively short latency operations, and (2) pending threads that are waiting on memory accesses having longer latencies. When selecting an instruction to issue each cycle, the two-level scheduler need only consider the smaller number of strands, enabling a simpler and more energy-efficient scheduler and a two-level register hierarchy (e.g., a main register file and a register file cache).

The two-level scheduler attempts to hide two distinct sources of latency in the system: (1) long, often unpredictable latencies, such as loads from DRAM or texture operations that are associated with the pending threads; and (2) shorter, often fixed or bounded latencies due to arithmetic operations, branch resolution, or accesses to local shared memory that are associated with the strands. The large pool of available threads in the pending threads allows the scheduler to accommodate the longer latencies, and the much smaller pool of strands is sufficient to accommodate common short latencies. The latency of arithmetic operations and shared memory accesses along with the amount of per-thread instruction-level parallelism influences the number of threads required to saturate the multi-threaded processors, such as SPMs 310. Reducing the set of threads or warps available for selection on a given cycle can reduce both the complexity and energy overhead of the scheduler, such as warp scheduler and instruction unit 312. One important consequence of reducing the number of concurrently active threads (strands) is that the immediate-term working set of registers can also be reduced.

Figure 4:
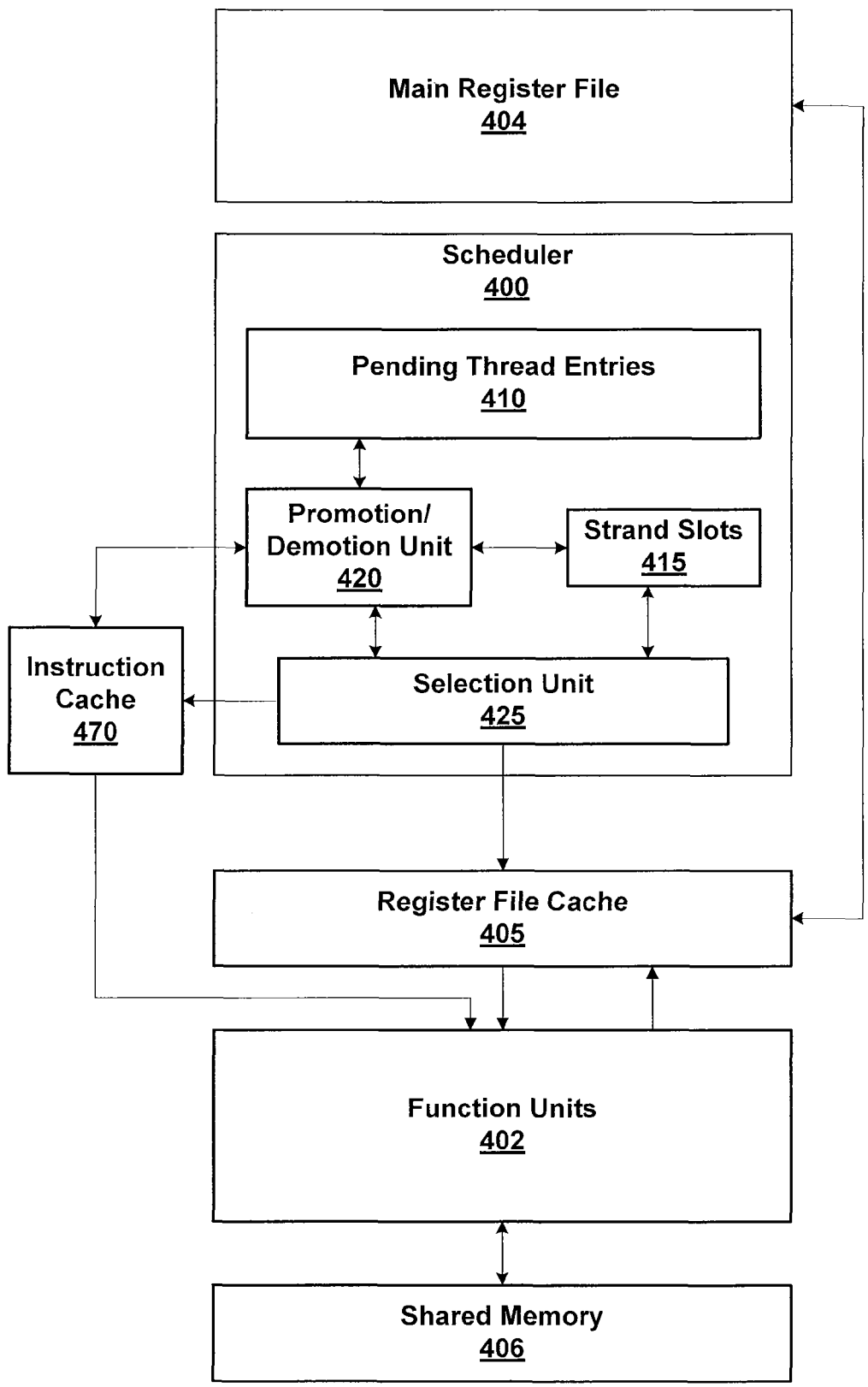
FIG. 4 is a block diagram of portions of a SPM 310 of FIG. 3C, according to one embodiment of the present invention.

FIG. 4 is a block diagram of portions of a streaming multiprocessor that is another example of SPM 310 of FIG. 3C, according to one embodiment of the present invention. As shown, this SPM 310 includes a two-level scheduler 400 instead of the warp scheduler and instruction unit 312. Instead of using a single level register file for local memory 304, a register file cache 405 and main register file 404 is used to store thread data and entry in the register file cache 405 and main register file 404 is accessible only by a particular thread. The register file cache 405 may be controlled by hardware, software, or a combination of hardware and software. In one embodiment, the register file cache 405 is replaced with an operand register file. The SPM 310 also includes an instruction cache 470, a shared memory 406, and functional units 402 that include execution units 302 and LSUs 303.

The scheduler 400 includes pending thread entries 410, strand slots 415, a promotion/demotion unit 420, and a selection unit 425. The scheduler 400 receives threads for execution that each include a portion of the program, i.e., code segment. State specific to each thread is stored in the pending thread entries 410. A sub-set of the threads are promoted from a first level to a second level, based on a latency characteristic.

The promoted threads are strands that occupy strand slots 415. A selection unit 425 selects strands from the strand slots 415 for execution and issues the selected strands to the function units 402.

The threads in the pending thread entries 410 may wait on long latency operations, such as cache misses, memory accesses, and texture map operations, to complete. These long latency operations are referred to as latency events. The strand slots 415 contain a much smaller set of strands that are available for selection by the selection unit 425. The strands may wait on shorter latencies due to mathematic operations, branch resolution, shared memory accesses, or cache hits. The strand slots 415 includes less storage capacity compared with the pending thread entries 410. When a strand encounters a latency event, the strand can be demoted from the set of strands and left in the pending thread entries 410. Organizing the threads into two levels presents a variety of new scheduling considerations for selection of strands and for promoting and demoting between the pending thread entries 410 and the strand slots 415.

The promotion/demotion unit 420 promotes threads from the pending thread entries 410 to the strand slots 415 when a slot is available in the strand slots 415. Threads that are considered for promotion based on the thread specific state that is stored in the pending thread entries 410. The state variables associated with each thread are shown in TABLE 1.

TABLE 1

| Thread state variables | |
|---|---|
| Thread State variable | Description |
| OLC | Outstanding load counter: count indicating the number of load operations that are outstanding (i.e., have not been completed) |
| PC | Program counter: pointer to the current instruction |
| IL | Instruction line: index of the line in the instruction cache 470 where the instruction corresponding to the PC is stored |
| IP | Instruction present: the instructions for the thread are present in the instruction cache 470 |
| SA | Strand assigned: the thread is promoted to a strand |
| SN | Strand number associated with the thread |

The state for each of the W threads includes an OLC which tracks the number of outstanding Load instructions that have not been completed. When a memory read request is issued having a long latency, the OLC is incremented. Once the requested data is received, the OLC is decremented. The state for each thread also includes a PC and an IP. The program counter indicates the current (or next) instruction for the thread.

The IP is set when the instructions for the thread are stored in the instruction cache 470. All instructions for a strand must be present in the instruction cache 470 before a slot in the strand slots 415 is allocated to a promoted thread to prevent idling a scarce strand slot on a long-latency instruction cache 470 miss. This requirement also places a maximum length limit on strands—i.e., strands can contain at most L instructions. This does not limit the number of clock cycles requires to execute a strand since the strands are allowed to branch within these L instructions.

The state for each thread also stores an IL that is an index to a cache line in the instruction cache 470 where the current instruction is stored. IL is only valid when IP is set. Finally, the state for each thread includes an SA and an SN. The SA is set when the thread is promoted to a strand and the SN specifies a unique identifier (strand number) of the strand that is allocated to the thread. When a thread is initialized on an SPM 310, the PC is set to the starting PC for the program or code segment, and the remaining state bits are set to zero.

Before a pending thread can be promoted to a strand and allocated a slot in the strand slots 415, the IP bit must indicate that the instructions for the pending thread are present in the instruction cache 470. Each cycle, threads with OLC=0 are selected, and an I-cache tag array within the instruction cache 470 is queried. The query has one of three outcomes: (1) a pending thread's instructions are already present in the instruction cache 470—in which case IP is set to TRUE (IP=1) and IL is updated to indicate the index of the matching cache line, or (2) the pending thread's instructions are not already present in the instruction cache 470 and a cache line is available—in which case a fill operation is initiated to store the instructions into the cache line, or (3) the pending thread's instructions are not present in the instruction cache 470 and there are no available lines for replacement.

When a strand terminates, the promotion/demotion unit 420 frees the slot allocated to the strand in the strand slots 415. When a slot is available, the promotion/demotion unit 420 searches the pending thread entries 410 for eligible pending threads (threads with OLC=0, IP=1, and SA=0) and selects one eligible pending thread to be allocated the available slot in strand slots 415, thereby promoting the selected thread to a strand. The SA of the promoted thread is set and SN is updated to the slot number of the allocated slot.

The selection unit 425 selects at least one eligible strand to issue each issue cycle. Eligible strands are determined by the selection unit 425 based on strand specific state that is stored in the strand slots 415. A round-robin or greedy technique may be used for scheduling the strands for execution. When a round-robin technique is used, a new eligible strand is selected by the selection unit 425 from the strand slots 415 each cycle using a rotating priority. When a greedy technique is used, instructions are issued from a single eligible strand for as long as possible, without stalling, before selecting another eligible strand. The selection policy used by the strand selection unit 425 can be tuned for performance. However, biasing the priority to the last selected strand (the greedy technique) has the advantage of finishing a strand quickly—and hence freeing a strand slot for another strand.

The greedy technique may be tempered by some type of age-based priority to prevent a long-running strand from preventing other strands from issuing. However, long-running strands may also be limited by dividing the program executing on the SPM 310 into code segments that have predictable timing. The timing is predictable because only threads that have been promoted to strands are selected to issue instructions. Of the W threads active in an SPM 310 at a given time, only S<<W are strands (executing threads). The strands run to completion without waiting on any long- or variable-latency operation, e.g., a load operation accessing memory via the MMU 328.

The choice between greedy and round-robin scheduling technique may be controlled at least in part by a compiler that inserts scheduling instructions into strands. Alternatively, the scheduling instructions may be inserted into strands at runtime. The scheduling instructions would inform the selection unit 425 that for better performance the strand should be scheduled with the round-robin or with greedy policy. For example, programs where strands executing on the same SPM 310 have a significant overlap in the data the strands load from cache (register file cache 405, uniform L1 cache 375, and/or L1 cache 320) have better performance if the loads accessing a given portion of memory are as closely spaced in time as possible. Closely spaced loads means that the cache has to hold on to the data for a shorter time window, which implies that the cache hit rate might be higher or that a smaller cache can result in equivalent performance compared with a larger cache attached to an SPM 310 with sub-optimal scheduling. To closely space loads from a number of strands, the using round-robin technique is generally results in better performance compared with using the greedy technique.

In one embodiment individual threads or warps are assigned priorities that are used during scheduling. The selection unit 425 selects the thread having the highest priority. A priority scheduling technique allows threads to be greedy when needed, by increasing their priority. When the priorities are set to similar values, the memory accesses should be coherent across the threads, assuming a round-robin technique is used by the selection unit 425.

The state variables associated with each strand are shown in TABLE 2.

TABLE 2

| Strand State variable | Description |
| --- | --- |
| E | Enable: the strand is enabled for execution, i.e., valid |
| PC | Program counter: pointer to the current instruction |
| IL | Instruction line: index of the line in the instruction cache 470 where the instruction corresponding to the PC is stored |
| CC | Cycle count: count indicating the number of cycles until the strand is allowed to issue the next instruction |

At the strand level, the state for each of the S strands includes an enable bit (E), a program counter (PC), an instruction line (IL), and a cycle counter (CC). CC specifies the number of cycles until a strand is allowed to issue its next instruction. When strand slot s is allocated to a newly promoted thread, the thread's PC is loaded into PC[s], the thread's IL is loaded into IL[s], CC[s] is set to zero, and E[s] is set to TRUE. The strands with CC=0 and E=1 are eligible to issue instructions.

Each issue cycle the selection unit 425 selects one of the eligible strands, s, and fetches an instruction from I$[PC[s]]. The instruction fetch does not need to access the tag array within the instruction cache 470 and is read from the cache line specified by the index stored in IL[s]. A cycle counter value that specifies the number of issue cycles that must elapse before all dependences for the next instruction are guaranteed to be satisfied is encoded with the instruction. On the next issue cycle, the instruction is issued to the function units 402. The function units 402 include an exec unit 302 and a LSU 303. When each of the operations specified by the instruction completes, the LSU 303 and the exec unit 202 arbitrate for the write port to any register(s) to be written in the register file cache 405 or main register file 404. When the LSU 303 wins the arbitration, the CC for the strand is decremented by the selection unit 425. When the LSU 303 loses the arbitration, the CC for the strand is not decremented by the selection unit 425. Using CCs to track dependencies is not as precise as maintaining a full scoreboard for the strands, but is much simpler. In another embodiment, scoreboarding is used to track the dependencies for each strand.

Within a strand, all scheduling is performed statically by the program compiler. The compiler assigns operations to function units 402 and timestamps and assigns live variables to registers in the main register file 404 and register file cache 405 over each variable's lifetime. The compiler encodes the static schedule by annotating each instruction with the count of cycles that must elapse before the next instruction from that strand is issued. Each time an instruction issues, the CC for the strand is updated to the cycle count value encoded in the instruction. This CC is decremented each issue cycle (assuming the load/store unit 303 wins arbitration for writing registers) and, when the CC reaches zero, the strand is eligible to issue.

Loads from shared memory 406 are permitted within a strand. Because of data-dependent bank conflicts, the completion time of these instructions is not statically predictable. There are several possible approaches to synchronizing the completion of loads from shared memory 406. A scoreboard that is used to track per-strand dependencies would be able to track the load completions. An alternative to a scoreboard is to add a per-strand shared-memory load counter (SLC) to keep track of the number of pending load operations accessing the shared memory 406 and to have each instruction encode whether the next instruction needs to wait for a load from the shared memory 406 (as a bit in parallel with the CC field).

In one embodiment, a wait on outstanding load (WOOL) bit is encoded in the instructions. The WOOL bit is set TRUE when the next instruction is dependent on one or more of the previous load operations that may incur a long latency. When the WOOL bit is set and the OLC is not zero, the strand has encountered a latency event resulting from a pending load having an unpredictable latency. Loads from shared memory do not incur a long latency and need not use the WOOL bit.

Figure 5A:
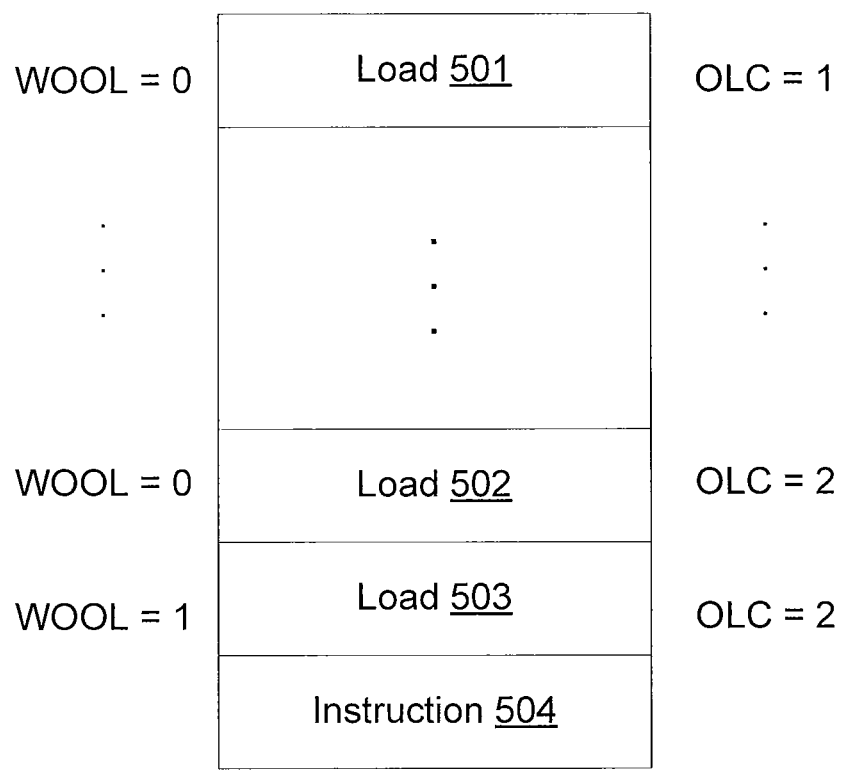
FIG. 5A is a conceptual diagram illustrating a condition causing demotion of a stand, according to one embodiment of the present invention.

FIG. 5A is a conceptual diagram illustrating a condition causing demotion of a stand, according to one embodiment of the present invention. A first instruction, load 501 having an encoded WOOL bit set FALSE is executed for a strand. The load 501 is not completed due to a cache miss, causing the OLC for the strand to increment. The LSU 303 computes the address for the load 501 and issues the load operation to the memory system. A strand can read operands from either the main register file 404 or the register file cache 405 and can write results to either the main register file 404 or the main register file cache 405. A strand can also access local, global, or shared memory using load and store operations. For load operations the result returns asynchronously. For load operations reading the shared memory 406, the result may target either the main register file 404 or the register file cache 405. For global and local memory loads, the result should target the main register file 404.

At a later point in time, the load 501 is still not completed and a second instruction, load 502 having an encoded WOOL bit set FALSE (WOOL=0) is executed for the strand. The load 502 is not completed due to a cache miss, causing the OLC for the strand to increment to a value of 2. A third instruction, load 503 having an encoded WOOL bit set TRUE (WOOL=1) is executed for the strand. The load 503 is completed, so the OLC for the strand is unchanged. The WOOL bit set TRUE indicates that the following instruction, instruction 504 requires one or more of the previous loads 501, 502, and 503 to complete before instruction 504 can be executed, i.e., instruction 504 is dependent on one or more of the previous loads 501, 502, and 503. When the strand encounters the load 503 with the WOOL bit set and the OLC that is not zero, a latency event occurs. The strand is no longer eligible to issue and will stall until the OLC is decremented to zero. Because the strand will stall for an undetermined number of issue cycles, possibly having a high latency, the strand is demoted to a pending thread.

The promotion/demotion unit 420 demotes a strand to a pending thread when the strand encounters a latency event so that the strand slots 415 are occupied only by strands that are eligible to issue or will be eligible to issue soon. In one embodiment, demotion is performed preemptively depending on occupancy of the strand slots 415. In another embodiment, instructions marked by the compiler as sourcing an operand produced by a long-latency operation cause the promotion/demotion unit 420 to preemptively demote the strand. Texture operations and global (cached) memory accesses may be considered long-latency operations. Such a preemptive policy speculates that the value will not be ready immediately because texture requests and loads that may access PP memory 204.

Alternatively, a strand may be demoted after the strand is ineligible to issue for a number that exceeds some threshold; however, because long memory and texture latencies are common, this strategy may reduce the effective size of the strand slots 415 and sacrifice opportunities to execute instructions. When a strand has a CC that is greater than zero, making the strand ineligible to issue for one or more issue cycles the strand may be retained in the strand slots 415. A CC that is greater than zero indicates a shorter latency due to pipelined computational operations or accesses to shared memory 406. While accesses of the shared memory 406 are not completely predictable due to potential bank conflicts, their latency is low enough that these accesses should not cause a strand to be demoted.

An advantage of separating the threads into two levels is that a smaller register file cache 405 may be used to store data generated during execution of the strands. In contrast, if the selection unit 425 selected from all of the threads in the pending thread entries 410 to issue a thread, the data generated during execution of all of the threads would need to be accessible, requiring a larger memory, such as the main register file 404. Entries in the register file cache 405 are only allocated to strands. Accessing the smaller register file cache 405 is accomplished quickly and the smaller register file cache 405 consumes less power compared with the main register file 404.

When a strand encounters a latency event and is demoted, the promotion/demotion unit 420 evicts the dirty entries in the register file cache 405 for the strand back to the main register file 404. To reduce power consumed during writeback operations and to avoid polluting the register file cache 405, the results of long latency operations bypass the register file cache 405, and are returned directly to the main register file 404. Allocating entries in the register file cache 405 only for stands and flushing the register file cache 405 when a strand is demoted increases the number of main register file 404 accesses, but dramatically decreases the storage requirements of the register file cache 405 (compared with storing data for all of the threads). In some cases combining register file caching with two-level selection produces a register file cache 405 that (1) is more than 20 times smaller than the main register file 404, (2) eliminates more than half of the reads and writes to the main register file 404, (3) has negligible impact on performance, and (4) reduces overall register file energy by 36%.

As shown in FIG. 4, the instruction cache 470 spans between strand-level and pending thread-level control. Instruction refills are initiated by the promotion/demotion unit 420 and the completion of these refills gates promotion of threads to strands. Instruction fetches are performed by the selection unit 425 and are always guaranteed to hit. Each instruction cache line includes a state (invalid, pending, valid), a tag (high bits of address), and a set of S strand bits.

As previously explained, strands have a maximum "instruction footprint" of L instructions and the instruction cache 470 is organized in lines of L instructions. For example, suppose an instruction (which may encode 3 or 4 operations) is 8B and L=64 instructions per strand, then the line size is 512B. An instruction cache 470 fill operation is initiated when the promotion/demotion unit 420 identifies a thread with the IP bit cleared, the PC for this warp does not hit in the tag array, and there is an available line in the instruction cache 470. When the fill operation is issued, the line's state is set to pending and the IL field of the thread is set to the index of the line. When the fill operation completes, the line's state is set to valid and the IP bit of the thread is set.

When a thread is allocated a slot in the strand slots 415 and promoted to a strand, the promotion/demotion unit 420 sets the strand bit associated with the newly promoted thread in the line of the instruction cache 470. When a line has at least one of the strand bits set, the line is considered pinned and not available for replacement. When a strand completes, the strand bit is cleared. Each time a strand is selected by the selection unit 425 to issue an instruction, the instruction cache 470 is accessed using the IL.

Any cache line with all strand bits cleared is considered available. However, to avoid thrashing by evicting lines between the time they are loaded and the time the requesting thread is granted a slot in the strand slots 415, the fill engine avoids reallocating lines in the pending state and lines that were recently loaded. A coarse timer (e.g., a three-bit saturating counter that increments every 100 cycles) can be added to each line's state to implement this policy. Alternatively, the number of inactive threads that have IP=1 and IL equal to the particular line number may be tracked and the replacement policy may replace lines pointed to by the fewest threads. When a valid line with clear strand bits is replaced, the IP bit of all threads with an IL bit matching the line must be cleared.

Although the scheduler 400 is described as promoting, demoting, and selecting at a thread level, the scheduler 400 may also be configured to promote, demote, and select at a warp level. When the scheduler 400 operates at the warp level, the selection unit 425 issues a warp for execution by the function units 402 so that the threads within the warp are executed in parallel.

Figure 5B:
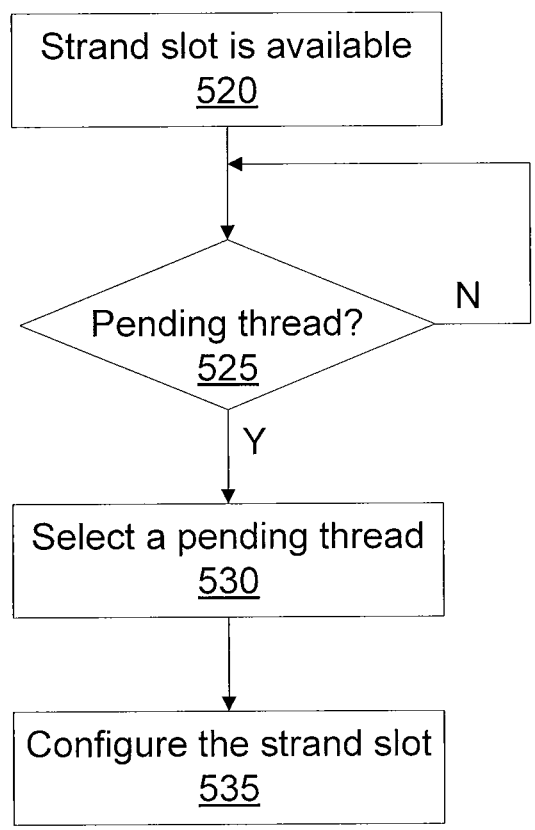
FIG. 5B is a flow diagram of method steps for promoting a thread to a strand, according to one embodiment of the present invention.

FIG. 5B is a flow diagram of method steps for promoting a pending thread to a strand, according to one embodiment of the present invention. At step 520 the promotion/demotion unit 420 determines that a slot in the strand slots 415 is available for allocation to a pending thread. At step 525, the promotion/demotion unit 420 determines if a pending thread is eligible to be promoted, and, if not, the promotion/demotion unit 420 waits until a pending thread is eligible. Threads with OLC=0, IP=1, and SA=0 are eligible to be promoted. If at least one pending thread is eligible to be promoted, at step 530 the promotion/demotion unit 420 selects a pending thread. Thread priority may be specified as part of the thread specific state, and the priority may be used by the promotion/demotion unit 420 to select one thread when multiple threads are eligible.

At step 535 the promotion/demotion unit 420 configures the available slot in the strand slots to complete promotion of the thread to a strand. Specifically, the promotion/demotion unit 420 copies the PC and the IL for the thread from the pending thread entries 410 to the strand state stored in the slot allocated to the strand in the strand slots 415. The promotion/demotion unit 420 also stores the strand number of the allocated strand in the SN field of the thread state for the thread and sets the SA bit in the thread state, indicating that the thread has been promoted to a strand.

Figure 5C:
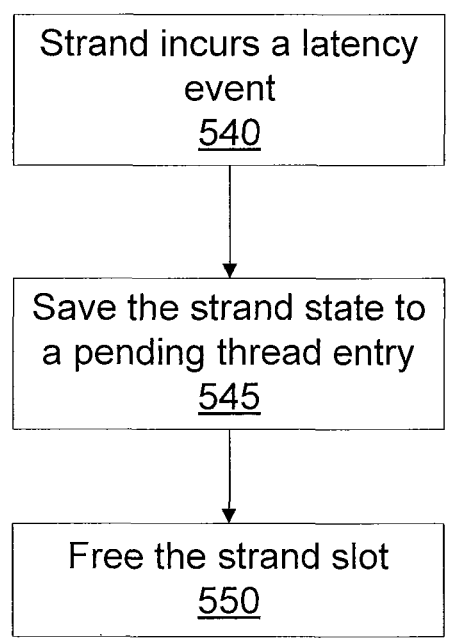
FIG. 5C is a flow diagram of method steps for demoting a strand to a thread, according to one embodiment of the present invention.

FIG. 5C is a flow diagram of method steps for demoting a strand to a thread, according to one embodiment of the present invention. At step 540 a strand encounters a latency event during execution. Latency events may include loads from PP memory 204, texture operations, or other operations that may incur a long latency. At step 545 the PC and IL fields of the strand state stored in the strand slots 415 is copied by the promotion/demotion unit 420 to the entry for the demoted thread in the pending thread entries 410. The promotion/demotion unit 420 also clears the SA bit in the thread state, indicating that the strand has been demoted to a thread. Finally, at step 550 the promotion/demotion unit 420 clears the E (enable) bit for the slot in the strand slots 415 to free (deallocate) the strand slot.

Figure 5D:
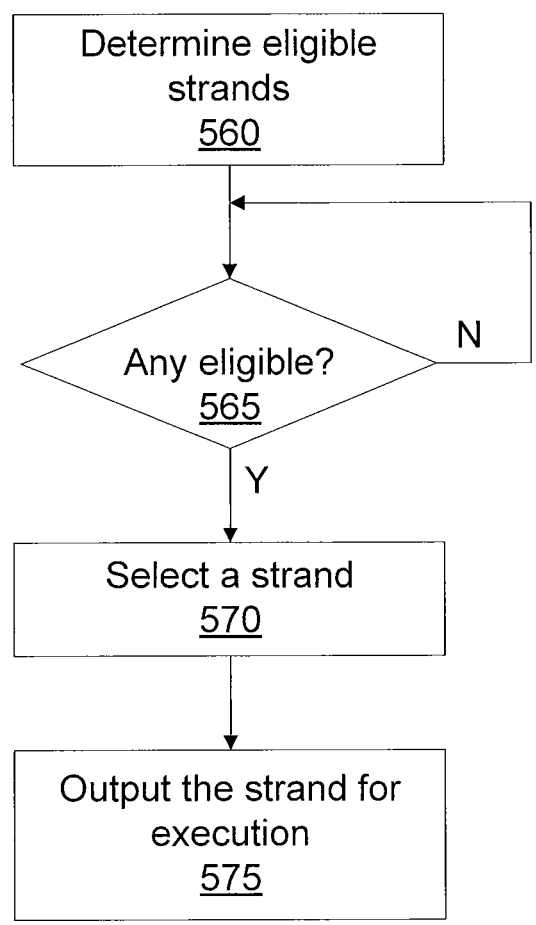
FIG. 5D is a flow diagram of method steps for selecting a strand that is issued for execution, according to one embodiment of the present invention.

FIG. 5D is a flow diagram of method steps for selecting a strand that is issued for execution, according to one embodiment of the present invention. At step 560 the selection unit 425 identifies strands that are eligible to be issued for execution. At step 565, the selection unit 425 determines if any strands are eligible to be promoted, and, if not, the selection unit 425 waits until a strand is eligible. Strands with CC=0 and E=1 are eligible to issue instructions. If at least one strand is eligible to be issued, then at step 570 the selection unit 425 selects a strand based on an arbitration policy. At step 575 the selection unit 425 outputs the strand for execution and increments the PC for the strand.

A cited advantage of dynamic scheduling is the ability to keep diverse data path resources busy by having one strand issue instructions that use resources left idle by another strand. This advantage of dynamic scheduling can be captured within a statically scheduled framework by allowing two strands to simultaneously issue operations to independent function units. At any point in time, a strand, s, is selected and issues a first instruction to the function units 402. A function unit mask may be associated with the first instruction to indicate the specific function units that are needed by the first instruction. In parallel with the main strand, s, one or more secondary strands, p, q, r . . . , may issue operations to the function units 402 that would otherwise be idle.

To implement simultaneous multi-stranding (SMS), extra instruction bandwidth is provisioned—e.g., two words per issue cycle—and separate instruction registers are maintained for one or more secondary strands. Each secondary strand instruction register maintains two masks—an occupancy mask and a completion mask. The occupancy mask indicates which function units within the function units 402 that the operation requires, the completion mask indicates which operations in the instruction have already been issued. Note that the completion mask is not needed if only complete issue is used.

A first level of SMS allows complete instructions to issue in parallel if they use disjoint sets of function units. In this case, if the selection unit 425 detects that the current instruction for strand r is independent of the current instruction for strand s, then the selection unit 425 issues strand s and r simultaneously.

A more ambitious form of SMS allows instructions to partially issue. For example, an embodiment of selection unit 425 detects when a secondary strand has an unissued operation that uses a function unit not used by the primary strand. In this case, the selection unit 425 issues the non-conflicting operations and updates the completion mask for the secondary strand(s). When the completion mask is equal to the occupancy mask the instruction is completely issued. When SMS is supported, the strand state is augmented to include at least one secondary instruction register IR, occupancy mask, and completion mask. The selection unit 425 multiplexes between the main and secondary IRs on an operation by operation basis based on simple bit operations from the occupancy masks. The PC of the secondary strand is incremented and the IR marked invalid when all operations for the secondary strand are issued.

The longer latency of the pending threads is hidden by selecting instructions to issue only for the strands. The two-level scheduler 400 stores the strand state and strand data in register files that are smaller than those needed to store the pending thread state and data. Pending threads are promoted to strands and strands are demoted to pending threads based on latency characteristics so that stalling during execution of the strands is minimized. The latency characteristics include the instruction present (IP) thread state and the outstanding load counter (OLC) thread state. When the latency for a pending thread is expired, i.e., when the long latency operation is complete, the pending thread may be promoted to a strand and begin (or resume) execution. When a strand encounters a latency event, the strand may be demoted to a pending thread while the latency is incurred. Because strands only have to hide the short latency of arithmetic units, only a few strands (S~4) are required to keep the function units busy. In contrast, a much larger number of threads or warps (W>=48) are needed to hide longer latencies, e.g., memory accesses and texture operations. Having a small number of strands permits a small, low-power, register file to be used to capture most of the operand bandwidth. Because strands are statically scheduled, no run-time instruction scheduling hardware is required.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for executing a program in a multi-threaded processing environment, the method comprising:
   receiving, for execution by a multi-threaded execution unit, a plurality of threads that each include a portion of the program;
   storing state specific to each thread of the plurality of threads in thread entries;
   promoting, based on a latency characteristic, a sub-set of threads from the plurality of threads to occupy strand slots, wherein the sub-set of threads that occupy the strand slots are considered for execution and remaining threads in the plurality of threads that do not occupy the strand slots are not considered for execution;
   selecting a first thread from a first strand slot of the strand slots for execution by the multi-threaded execution unit;
   issuing the first thread for execution by the multi-threaded execution unit;
   determining that a second thread occupying a second strand slot of the strand slots has encountered a latency event; and
   demoting the second thread by removing the second thread from the second strand slot.

2. The method of claim 1, further comprising copying state associated with the second thread from the second strand slot to an entry in the thread entries.

3. The method of claim 1, further comprising copying state associated with the first thread from an entry in the thread entries to the first strand slot that is allocated to the first thread.

4. The method of claim 1, further comprising:
   determining that a third thread that is stored in a third strand slot of the strand slots will be unable to execute for a number of clock cycles; and
   retaining the third thread in the third strand slot.

5. The method of claim 1, wherein the selecting comprises identifying one or more threads occupying the strand slots that are eligible to issue.

6. The method of claim 1, further comprising:
   determining that execution of the first thread is complete; and
   deallocating the first strand slot assigned to the first thread.

7. The method of claim 1, further comprising dividing the program into a plurality of code segments having a limited number of instructions to generate the plurality of threads.

8. The method of claim 1, wherein the latency characteristic indicates presence of instructions corresponding to a thread in an instruction cache.

9. A non-transitory computer-readable storage medium storing instructions that, when executed by a processor, cause the processor to execute the program in a multi-threaded processing environment, by performing the steps of:
   receiving a plurality of threads for execution that each include a portion of the program;
   storing state specific to each thread of the plurality of threads in thread entries;
   promoting, based on a latency characteristic, a sub-set of threads from the plurality of threads to occupy strand slots, wherein the sub-set of threads that occupy the strand slots are considered for execution and remaining threads in the plurality of threads that do not occupy the strand slots are not considered for execution;
   selecting a first thread from a first strand slot of the strand slots for execution;
   issuing the first thread for execution;
   determining that a second thread occupying a second strand slot of the strand slots has encountered a latency event; and
   demoting the second thread by removing the second thread from the second strand slot.

10. A system for executing a program in a multi-threaded processing environment, the system comprising:
    an instruction memory that stores instructions for the program; and
    a scheduler that is coupled to the instruction memory and:
       receives a plurality of threads for execution that each include a portion of the program;
       stores state specific to each thread of the plurality of threads in thread entries;
       promotes, based on a latency characteristic, a sub-set of threads from the plurality of threads to occupy strand slots, wherein the sub-set of threads that occupy the strand slots are considered for execution and remaining threads in the plurality of threads that do not occupy the strand slots are not considered for execution;

selects a first thread from a first strand slot of the strand slots for execution;

issues the first thread for execution;

determines that a second thread that occupies a second strand slot of the strand slots has encountered a latency event; and demotes the second thread by removing the second strand from the second strand slot.

11. The system of claim 10, wherein the scheduler copies state associated with the second thread from the second strand slot to an entry in the thread entries.

12. The system of claim 10, wherein the scheduler copies state associated with the first thread from an entry in the thread entries to the first strand slot that is allocated to the first strand.

13. The system of claim 10, wherein the scheduler:

determines that a third thread occupying a third strand slot of the strand slots is unable to execute for a number of clock cycles; and retains the third strand in the third strand slot.

14. The system of claim 10, wherein the scheduler identifies one or more threads occupying the strand slots that are eligible to issue to select the first strand.

15. The system of claim 10, wherein the scheduler:

determines that an instruction of the first thread and an instruction of a second strand use different function units; and simultaneously issues the first thread and the second thread for execution.

16. The system of claim 10, wherein the program is divided into a plurality of code segments having a limited number of instructions to generate the plurality of threads.

17. The system of claim 10, wherein the instruction memory comprises an instruction cache and a backing memory and the latency characteristic indicates presence of instructions corresponding to a thread in the instruction cache.

18. The system of claim 10, further comprising:

a main register file that stores data associated with the plurality of threads; and a register file cache that is coupled between the scheduler and the main register file and that stores data associated with the strand slots.

19. The system of claim 18, wherein management of the register file cache is controlled by hardware.

* * * * *